UNITED STATES PATENT OFFICE

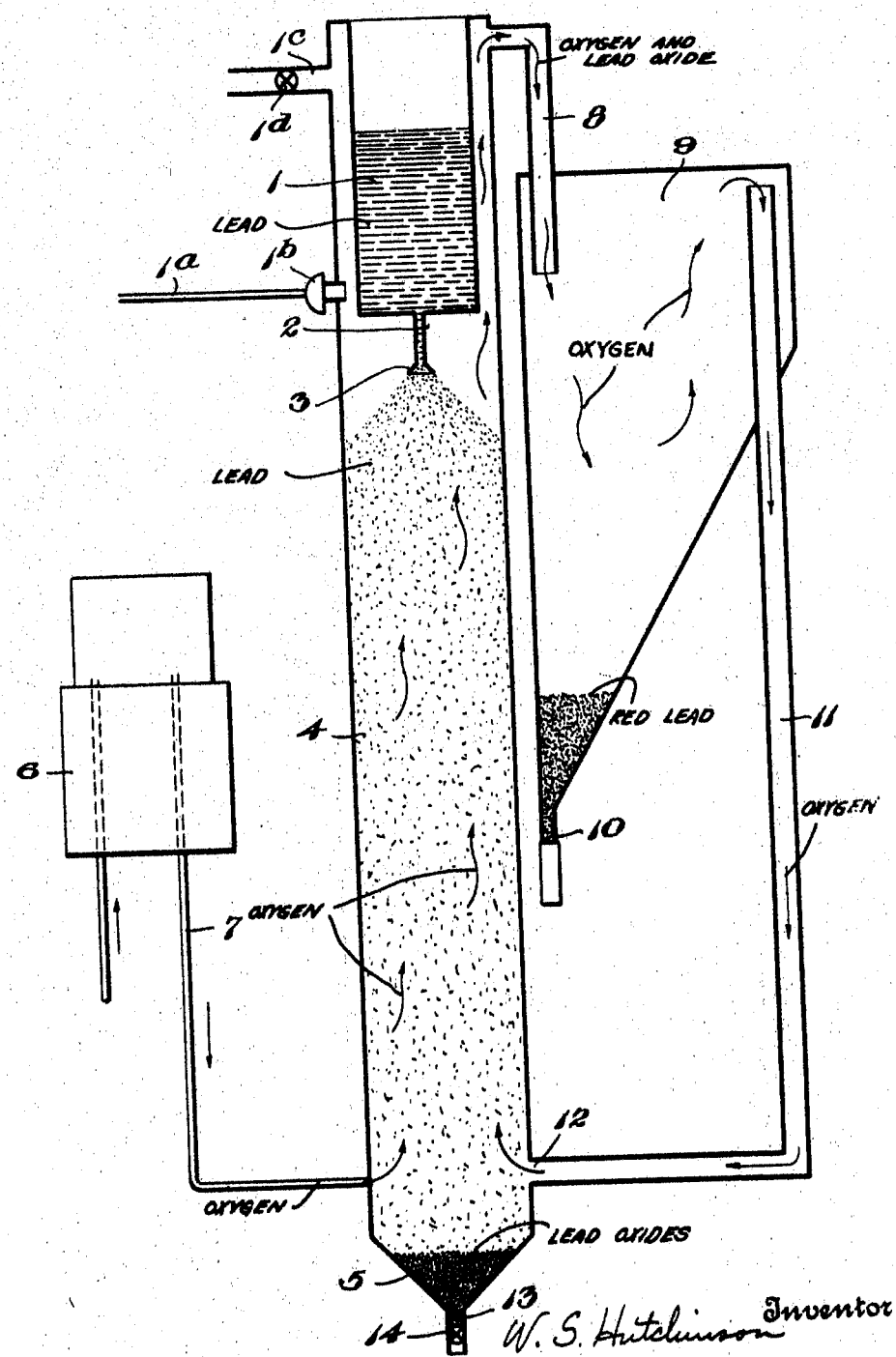

WILLIAM SCOTT HUTCHINSON, OF SCARSDALE, NEW YORK; EVELYN WATERS HUTCHINSON, EXECUTRIX OF WILLIAM SCOTT HUTCHINSON, DECEASED, ASSIGNOR TO WILLIAM J. PLEWS, OF NEW YORK, N. Y.

PROCESS FOR THE MANUFACTURE OF LEAD OXIDES

Application filed May 11, 1925, Serial No. 29,333. Renewed August 13, 1932.

This invention relates to the production of oxides of lead.

The invention relates particularly to the formation of those oxides known as litharge, massicot and red lead. As is well known, the litharge and massicot are both lead monoxide, massicot being formed as the temperature rises above the dissociation point of red lead and litharge being fused massicot.

The main object of my invention is to provide an improved process for producing such oxides.

A further object of the invention is to provide products of the character indicated having superior qualities for many uses as for instance pigments and pasting material for storage battery plates.

Other and ancillary objects of the invention will appear hereinafter.

According to the present invention, the lead oxides may be produced continuously from molten lead and a gas consisting largely of oxygen.

Present processes for the manufacture of lead oxides effect the oxidation of lead by agitation of molten material and the removal of the oxides as rapidly as possible to expose more molten metal to the oxidizing action.

All of the present processes maintain large quantities of material in the reaction zone with the inevitable result that more heat is required to maintain the reaction temperature than is available from the oxidation of the lead. As a result, the oxidation is slow, incomplete and costly.

The present invention remedies this situation by subdividing the molten lead by atomization or vaporization so that the oxidation of the superficial area of any particle produces sufficient heat to volatilize some oxide and metal of the particle and thereby expose more metal to the oxidizing action, thus making the process one of continuous oxidation, flamelike in action and intensity.

When using air for the oxidation of lead it is found that red lead dissociates at about 545° C. and that above this temperature only the monoxide in the form of massicot or litharge may be formed. If pure oxygen is used, the temperature may be raised to 630° C. before red lead decomposes into massicot which will fuse into litharge at about 888° C., the heat necessary to melt the lead (which melts at approximately 327° C.) and produce all of these substances will be provided by my method of combustion of the lead and oxygen.

There will be several advantages in substituting oxygen for air. In the first place, the heat required to heat the inert nitrogen of the atmosphere to the reaction temperature will be conserved and becomes available for the preheating of material for subsequent oxidation. This saving in heat is immediately evidenced by a higher reaction temperature. Due to the higher temperature of dissociation of red lead this increase in reaction temperature does not prevent the completion of the oxidation when properly controlled as will be later shown.

Due to the higher reaction temperature and the isolation of the oxidizing particle the vapor tension will be greatly increased. At the temperature of conversion of massicot into red lead in oxygen (630° C.) the vapor tension of lead is eleven times the vapor tension at the temperature of formation in air (545° C.).

In the present process the temperature of the reacting particle will flash or burn as a flame with the result that litharge is formed at an extremely high temperature approaching the boiling point of lead (1555° C.). The material formed will be litharge which when cooled in oxygen to 630° C. changes into red lead. The production of the red lead by cooling as stated results in particles of much more uniform fineness than previously so that the substance is better adapted for pigments and other uses. Furthermore the fineness of the product is such that it may be used without the necessity of milling or grinding.

It is obvious that the oxygen alone cannot complete the oxidation spontaneously unless the lead is capable of being converted into finely divided form with a high partial pressure. As the temperature of the molten lead is increased the necessity for mechanical means of atomization is decreased due to the fact that the vapor tension of the lead becomes an active force in converting lead liquid into lead vapor, I prefer, therefore, to use the heat of the reaction as far as possible and extraneous heat in so far as is necessary for the production of a sufficiently high vapor tension of lead to insure its ignition in oxygen.

Theoretically there are formed 229 calories per gram of litharge and fully 75% of this is available above 630° C. for the conversion of liquid into vapor.

In the accompanying drawing is shown diagrammatically an apparatus by which the invention may be carried out and in connection with which it may be illustrated.

Referring to the drawing 1 is a kettle maintained partially or completely filled with molten lead to be oxidized when starting operations. Kettle 1 is heated by any convenient source of heat, in the present case shown as a gaseous fuel from pipe 1a and being burned at burner 1b. The products of combustion pass around kettle 1 and serve to preheat same to the kindling point of lead in oxygen. The products of combustion finally escape through conduit 1c which is controlled by valve 1d. Valve 1d is open during the preheating period and closed when the process has been properly started to prevent the loss of oxygen.

At the bottom of kettle 1 is a pipe 2 connected to a spray nozzle 3 for transforming the molten lead into a fine spray.

As the lead issues from nozzle 3 in spray form it comes in contact with the substantially pure oxygen in the chamber which has been heated by lead oxide previously formed. The reaction between the lead and oxygen is very vigorous and takes place above 630° C. according to the following reaction:

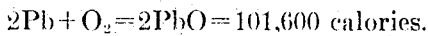
$$2Pb + O_2 = 2PbO = 101,600 \text{ calories.}$$

Since all of the materials were already preheated, the heat formed becomes available for the preheating of more oxygen and lead so that the reaction proceeds spontaneously like the burning of oil or any other liquid fuel.

Because of the high temperature only litharge is formed. This material is at or near its fusing point but as it leaves the flame it condenses and coalesces into a fine spray or mist and falls through chamber 4 through which oxygen is rising. There is an exchange of heat whereby the oxygen is warmed and the PbO is cooled. As the litharge cools in contact with oxygen it changes at 630° C. to $Pb_3O_4$ according to the following:

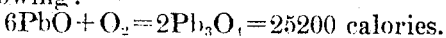
$$6PbO + O_2 = 2Pb_3O_4 = 25200 \text{ calories.}$$

The heat formed becomes available for preheating oxygen and is in addition to the sensible heat of PbO.

The solid oxides of lead formed in chamber 4 are of various particle size so that some will fall and be collected in hopper 5 from which they may be withdrawn.

The oxygen which is consumed is replaced by more from gasometer 6 through pipe 7 which connects to column 4. The oxygen in column 4 rises due to convection carrying with it the finer particles of lead oxide and passes around kettle 1 which is heated thereby. This cooling serves to convert suspended litharge into red lead which is carried by the gas current through pipe 8 into settling vessel 9 where the gas current becomes sufficiently slow to allow part or all of the red lead to settle out. A further cooling of the gas in vessel 9 establishes downward convection of the oxygen and the gas circuit is completed so that it will return to column 4 and be used over again.

The red lead separating in vessel 9 collects at the bottom where it may be withdrawn through hopper 10. The oxygen returns to the system by pipe 11 entering column 4 at point 12. The lead oxide which settles in column 4 collects in hopper 5 and is withdrawn as required through pipe 13 and valve 14.

The means for effecting my process as shown in the drawing is merely exemplary, and it is not desired to be confined to any specific means. The process may be practiced with improved results as applied to the production of litharge or massicot and red lead by oxidizing lead to litharge or massicot at substantially higher temperatures than are used at present, and for litharge approaching the boiling point of lead, and for massicot a temperature approaching that of formation of litharge as upper limits and then cooling the litharge or massicot in substantially pure oxygen to convert same into red lead.

Substantially pure litharge or massicot may be obtained by preventing the litharge or massicot formed in the foregoing process from cooling while subjected to oxygen, in other words by excluding oxygen from it while cooling.

Although it is economical to do so, my products need not necessarily be formed in an atmosphere of pure oxygen. It is sufficient if there is enough oxygen in the atmosphere to maintain a sufficiently high temperature to produce spontaneous combustion of lead flamelike in character. This requires a higher percentage of oxygen than is found in air and the more nearly the atmosphere is pure oxygen the more economical will be the process because of the avoidance of heating up inert elements such as the nitrogen of the air.

The oxides which are products of the process as described are extremely finely divided and of improved characteristics for numerous uses such as ingredients of paint, paste for storage battery plates etc.

While I prefer to form litharge in the first instance and then cool it to form red lead because, among other reasons, this gives a more uniformly and finely divided product which fits it for uses to which a coarser product is unadapted and moreover it gives better economy, by lowering the temperature at which the reaction takes place massicot or red lead may be formed directly. This lowering of temperature the reaction may be accomplished by lowering the temperature of the supplied oxygen, by making the subdivision of the lead coarser, or in other ways. Also by suitable regulation such as by regulating the supply of oxygen, the temperature and in other ways a mixture or blend, in the desired proportions, of red lead and monoxide may be obtained which will be of superior quality because of the uniformity and fineness of the particles and homogeneousness of the mixture.

As in all other processes where precipitation is involved, the particle size or classification will be controlled by the rate of cooling. A partial separation into coarse and fine material will be effected by the rate of oxygen circulation.

While the invention has been illustrated in what are considered its best applications, the details of the processes recited may be varied and they may be carried out by other apparatus than that shown without departing from the spirit of the invention. The invention is not therefor limited to the precise details of methods as recited nor to practice with the apparatus as shown in the drawing.

What I claim is:

1. A process for the production of lead oxides which comprises oxidizing finely divided lead to lead oxide and transferring the heat of the reaction to uncombined oxygen and lead previous to their combustion in a chemical reaction the heat transferred to the lead being at least sufficient to maintain it in melted condition.

2. A process for the production of lead oxides which comprises oxidizing finely divided lead to litharge and transferring the heat of the reaction to uncombined oxygen and lead previous to their combustion in a chemical reaction the heat transferred to the lead being at least sufficient to maintain it in melted condition.

3. A process for the production of lead oxides which comprises oxidizing vaporous lead to litharge and transferring the heat of the reaction to uncombined oxygen and lead previous to their combustion in a chemical reaction.

4. A process for the production of lead oxides which comprises oxidizing vaporous lead to litharge and transferring the heat of the reaction to uncombined lead previous to combustion in a chemical reaction.

5. A process for the production of lead oxides which comprises heating lead above its melting point, contacting the lead with oxygen at a temperature at least as great as that of said melting point to produce a monoxide and cooling the monoxide in substantially pure oxygen to produce red lead.

6. A process for the production of lead oxides which comprises oxidizing lead above the temperature of dissociation of red lead and effecting an exchange of the heat of oxidation in an atmosphere rich in oxygen whereby the lead oxide is converted into a compound containing more oxygen and the uncombined lead and oxygen are heated to subsantially the boiling point of lead.

7. A process for the production of lead oxides which comprises heating lead and oxygen to substantially the temperature of boiling lead, combining lead and oxygen to form finely divided litharge, cooling said litharge by a heat exchange, preheating lead and oxygen and converting the litharge into a mixture containing red lead.

8. A process for the production of lead oxides which comprises establishing in a reaction chamber a flame of finely divided lead in oxygen, cooling the products to below the temperature of dissociation of red lead, producing a mixture containing red lead conveying said mixture into another chamber, separating the oxides from the mixture, returning the oxygen to the reaction chamber and adding more oxygen to maintain the oxygen atmosphere.

9. A process for the production of lead oxides which comprises establishing in a reaction chamber a flame of vaporous lead in oxygen, cooling the products to below the temperature of dissociation of red lead, producing a mixture containing red lead conveying said mixture into another chamber, separating the oxides from the mixture, returning the oxygen to the reaction chamber and adding more oxygen to maintain the oxygen atmosphere.

10. A process for the production of lead oxides which comprises producing litharge vapor and cooling the same in an atmosphere of oxygen.

11. A process for the production of lead oxides which comprises combining lead and oxygen at a temperature above that of dissociation of red lead to produce litharge cooling the litharge so formed and maintaining the litharge in an oxygen atmosphere until it is cooled below the temperature of dissociation of red lead.

12. A process for the production of lead oxides which comprises combining lead and oxygen at a temperature above that of dissociation of red lead to produce lead monoxide cooling the monoxide so formed and maintaining the monoxide in an oxygen atmosphere until it is cooled below the temperature of dissociation of red lead.

13. A process for the production of lead oxides which comprises combining lead and oxygen at a temperature above that of dissociation of red lead to produce litharge cooling the litharge so formed and maintaining the litharge out of contact with oxygen until it is cooled below the temperature of dissociation of red lead.

14. A process for the production of lead oxides which comprises oxidizing finely divided lead to litharge and transferring the heat of the reaction to uncombined oxygen previous to combustion in a chemical reaction, the heat transferred to the oxygen being at least sufficient to maintain an amount of lead that will combine therewith in melted condition.

15. A process for the production of lead oxides which comprises oxidizing finely divided lead to litharge and transferring the heat of the reaction to uncombined lead previous to combustion in a chemical reaction the heat transferred to the lead being at least sufficient to maintain it in melted condition.

16. A process for the production of lead oxides which comprises oxidizing finely divided molten lead to monoxide and transferring the heat of the reaction to uncombined oxygen previous to their combustion in a chemical reaction.

17. A process for the production of lead oxides which comprises oxidizing finely divided lead to monoxide and transferring the heat of the reaction to uncombined lead previous to combustion in a chemical reaction the heat transferred to the lead being at least sufficient to maintain it in melted condition.

18. A process for the production of lead oxides which comprises heating lead above its melting point, contacting the lead with oxygen at a temperature at least as great as that of said melting point to produce litharge and cooling the litharge in substantially pure oxygen to produce red lead.

19. A process for the production of lead oxides which comprises producing litharge vapor and cooling the same in the absence of oxygen.

20. A process for the production of lead oxides which comprises combining lead and oxygen at a temperature above that of dissociation of red lead to produce lead monoxide, cooling the monoxide so formed and maintaining the monoxide out of contact with oxygen until it is cooled below the temperature of dissociation of red lead.

In testimony whereof I have signed this specification this 8th day of April 1925.

WILLIAM SCOTT HUTCHINSON.